(12) United States Patent
Tarr et al.

(10) Patent No.: US 11,269,419 B2
(45) Date of Patent: *Mar. 8, 2022

(54) VIRTUAL REALITY PLATFORM WITH HAPTIC INTERFACE FOR INTERFACING WITH MEDIA ITEMS HAVING METADATA

(71) Applicant: UNIVERSITY OF SOUTH CAROLINA, Columbia, SC (US)

(72) Inventors: Simon Tarr, Columbia, SC (US); Evan Meaney, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,274

(22) Filed: Jul. 17, 2020

(65) Prior Publication Data

US 2020/0348759 A1    Nov. 5, 2020

Related U.S. Application Data

(63) Continuation of application No. 16/521,999, filed on Jul. 25, 2019, now Pat. No. 10,747,331.

(60) Provisional application No. 62/711,161, filed on Jul. 27, 2018.

(51) Int. Cl.
*G06F 3/01* (2006.01)
*G06F 3/0482* (2013.01)
*G06F 16/43* (2019.01)

(52) U.S. Cl.
CPC .............. *G06F 3/017* (2013.01); *G06F 3/014* (2013.01); *G06F 3/016* (2013.01); *G06F 3/0482* (2013.01); *G06F 16/43* (2019.01)

(58) Field of Classification Search
CPC .......... G06F 3/017; G06F 16/43; G06F 3/014; G06F 3/016; G06F 3/0482
See application file for complete search history.

(56) References Cited

U.S. PATENT DOCUMENTS

| | | |
|---|---|---|
| 2006/0209019 A1 | 9/2006 | Hu |
| 2007/0060385 A1 | 3/2007 | Dohta |
| 2008/0166022 A1 | 7/2008 | Hildreth |
| 2019/0342507 A1* | 11/2019 | Dye ........................ H04N 7/141 |
| 2019/0342993 A1* | 11/2019 | Ahn ........................ G10K 9/125 |

* cited by examiner

*Primary Examiner* — Sejoon Ahn
(74) *Attorney, Agent, or Firm* — Burr & Forman, LLP

(57) ABSTRACT

Apparatuses, systems, and methods for interacting with media items in a virtual reality environment are provided. An apparatus is provided that includes processing circuitry configured to control a display of a virtual reality interface to render representations of media items in the virtual reality environment. The processing circuitry is further configured to control the display to render metadata links between a metadata attribute and the representations of the media items, detect, from a haptic interface, a haptic gesture to bundle and pull the metadata links into a foreground, and control the display to render representations of the media items having the metadata attribute in the foreground for selection.

20 Claims, 12 Drawing Sheets

VIRTUAL REALITY PLATFORM WITH HAPTIC INTERFACE FOR INTERFACING WITH MEDIA ITEMS HAVING METADATA

TECHNICAL FIELD

Example embodiments generally relate to information technologies and, more particularly, relate to apparatuses, systems, and methods for searching and navigating through vast amounts of information to identify desired information.

BACKGROUND

Conventional search and information navigation tools use antiquated approaches often based solely on text strings or hierarchical folder-based information storage. Such approaches are not intuitive for searching and navigating and, therefore, require a degree of experience and/or training to be efficient and effective in their use. Further, when attempting to interface with non-textual information, such as, images and videos, querying and navigation can be cumbersome and difficult, requiring frequent scrolling, re-querying, or filtering to identify desired information or content. As such, there is a need for improved, non-conventional approaches to information querying and navigation that are intuitive to users to assist in efficiently and effectively identifying desired content.

BRIEF SUMMARY OF SOME EXAMPLES

According to some example embodiments, a system for interacting with media items in a virtual reality environment is provided. The system may comprise processing circuitry, a virtual reality interface, and a haptic interface device. The virtual reality interface may be operably coupled to the processing circuitry, and the virtual reality interface may comprise a display and a motion sensor. The display may be configured to render a virtual reality environment. The motion sensor may be configured to detect motion of a user. The haptic interface device may be operably coupled to the processing circuitry. The processing circuitry may be configured to control the display to render representations of media items. In this regard, the media items may be associated with a metadata attribute. The processing circuitry may be further configured to control the display to render metadata links between the metadata attribute and the representations of the media items that have the selected metadata attribute. The processing circuitry may also be configured to detect, from the haptic interface, a haptic gesture to bundle and pull the metadata links into a foreground, and receive, at the processing circuitry, a selection of the media items that have the metadata links that have been bundled and pulled into the foreground, in response to detecting the haptic gesture to bundle and pull the metadata links into the foreground.

According to some example embodiments, an apparatus for interacting with media items in a virtual reality environment is provided. The apparatus may include processing circuitry configured to control a display of a virtual reality interface to render representations of media items in the virtual reality environment. In this regard, the media items may be associated with a metadata attribute. The processing circuitry may be further configured to control the display to render metadata links between the metadata attribute and the representations of the media items that have the metadata attribute. The processing circuitry may also be configured to detect, from the haptic interface, a haptic gesture to bundle and pull the metadata links into a foreground, and receive, at the processing circuitry, a selection of the media items that have the metadata links in response to detecting the haptic gesture to bundle and pull the metadata links into the foreground.

According to some example embodiments, a method is provided. The method may comprise controlling a display of a virtual reality interface to render representations of media items in the virtual reality environment. In this regard, the media items may be associated with a metadata attribute. The example method may also comprise controlling the display to render metadata links between the metadata attribute and the representations of the media items that have the metadata attribute. The example method may also comprise detecting, from the haptic interface, a haptic gesture to bundle and pull the metadata links into a foreground, and receiving, at the processing circuitry, a selection of the media items that have the metadata links that have been bundled and pulled into the foreground, in response to detecting the haptic gesture to bundle and pull the metadata links into the foreground.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 1 illustrates an example system for interacting with media items in a virtual reality environment according to an example embodiment;

FIG. 2 provides an example flowchart for performing a query and interfacing with media item results according to an example embodiment;

DETAILED DESCRIPTION

Figure 1:
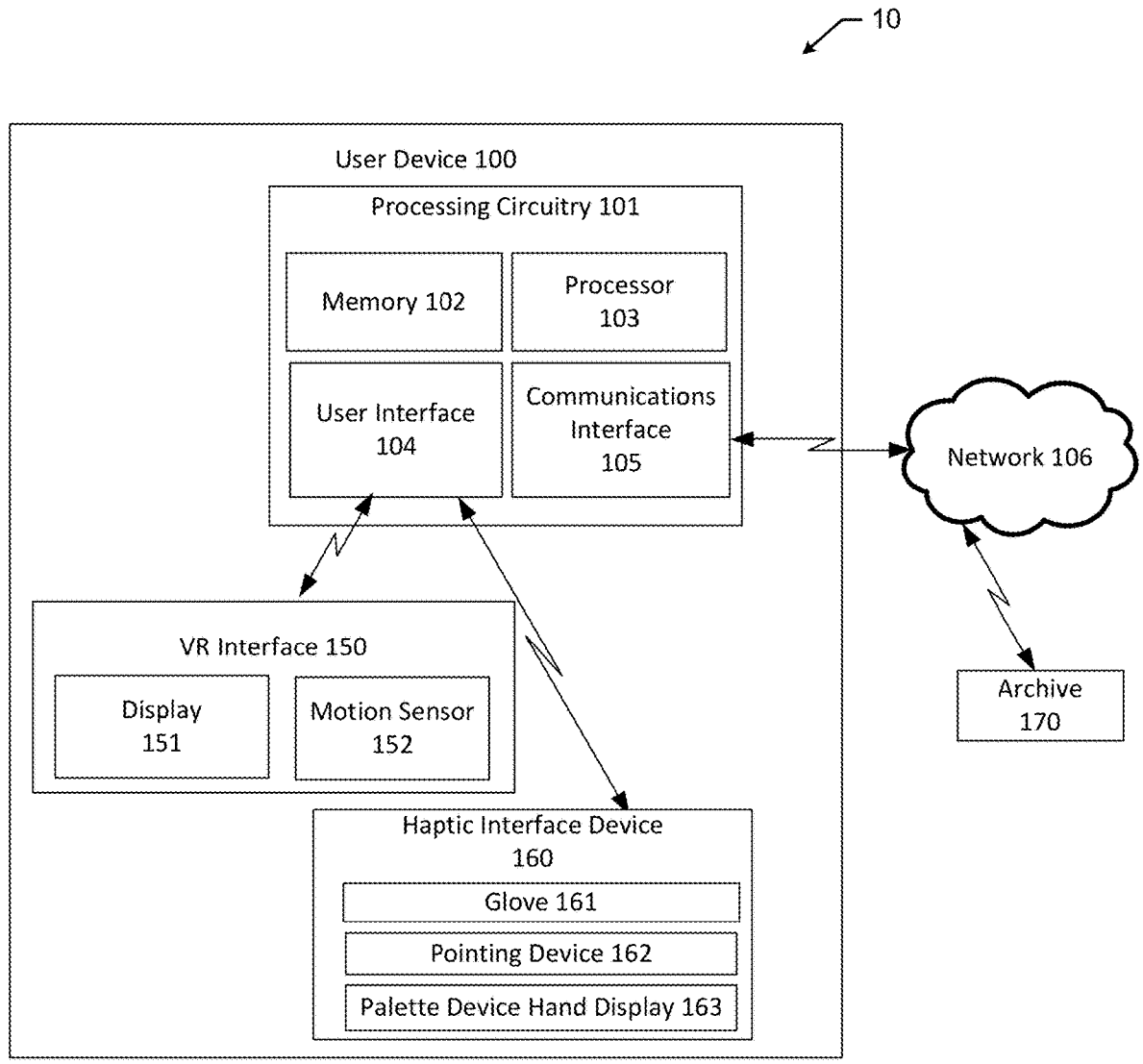

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A.

As indicated above new and unconventional systems, apparatuses, and methods are provided herein for interacting with media items that are results of a query, in a virtual reality environment. In this regard, the example embodiments provided herein are superior to conventional techniques used for searching and navigating results of a query in the form of media items, such as images and videos. Prior art two-dimensional result environments have cumbersome and complex user interfaces that require experience to efficiently utilize. Example embodiments improve upon such prior art techniques by permitting a user to intuitively interact with search results in a natural, intuitive manner that leverages a virtual reality environment. According to some example embodiments, metadata associated with media items may be rendered and therefore is made "visible" to a user for intuitive interaction via gestures such as grasping metadata links between items in a VR environment. Example embodiments are superior to prior art techniques because the example embodiments can allow users to visibly understand and appreciate the metadata relationships between media items and navigate through the metadata relationships in a virtual reality environment to identify a target set of media items.

According to some example embodiments, a method and system that leverages a haptic user interface in a VR environment for retrieving, displaying, modifying, and manipulating media items is provided. The media items may be derived from data sets of archives and databases. Example embodiments may allow users to query and browse archive databases of videos, images, two-dimensional and three-dimensional scans, and other media items, and display the media items in a VR environment rendered in, for example, a head-mounted display. In the head-mounted display, search results may be shown as a collection or constellation that uses different parameters from the metadata of the items to arrange and re-arrange the items in virtual space around the user. Within the VR environment, the user may hold, for example, a palette device in one hand that displays a variety of object including a detailed version of a selected media item, media controls to manipulate the selected media item, and metadata retrieved about that selected media item. Using the other hand, the user may select and move items, as well as, facilitate interaction with unique tangible metadata links in the VR environment that may not been visualized or manipulated by other means. Such interactions with the VR environment, according to some example embodiments, may be facilitated by use of controller gloves or a grasping/pointing tool the movement of which is detected and presented in the VR environment.

Such example embodiments and others may be implemented in systems and apparatuses having a variety of architectures. One architecture is the example system 10 shown in FIG. 1. The system 10 of FIG. 1 may include a user device 100, a network 106, and an archive 170. FIG. 1 shows some of the components of the user device 100. In this regard, the user device 100 may include processing circuitry 101, a virtual reality (VR) interface 150, and a haptic interface device 160. The user device 100 may include portions that reside in separate physical housings or may be integrated into a single housing. For example, the processing circuitry 101 may be a component of a computer system that that interfaces with the VR interface 150, which may be separately housed. However, according to some example embodiments, the user device 100 may include a VR headset that houses both the processing circuitry 101 and the VR interface 150. According to some example embodiments, the haptic interface device 160 may be embodied as or include a glove 161, pointing device 162, palette device hand display 163, or the like to interface with a user's hands, and thus may be other separate components of the user device 100. Further, the haptic interface device 160 may also include a hand palette device that may be held in the hand of the user and interacted with as needed, similar to a tablet within the VR environment. The processing circuitry 101 may comprise a memory 102, a processor 103, a user interface 104, and a communications interface 105. The processing circuitry 101 may be operably coupled to the VR interface 150 and the haptic interface device 160 as part of the user device 100. The processing circuitry 101 may be operably coupled to the network 106, which may be disposed external to the user device 100.

Further, according to some example embodiments, processing circuitry 101 may be in operative communication with or embody, the memory 102, the processor 103, the user interface 104, and the communications interface 105. The processing circuitry 101 may be configurable to perform various operations as described herein. In this regard, the processing circuitry 101 may be configured to perform computational processing, memory management, user interface control and monitoring, and manage remote communications according to an example embodiment. In some embodiments, the processing circuitry 101 may be embodied as a chip or chip set. In other words, the processing circuitry 101 may comprise one or more physical packages (e.g., chips) including materials, components or wires on a structural assembly (e.g., a baseboard). The processing circuitry 101 may be configured to receive inputs (e.g., via peripheral components), perform actions based on the inputs, and generate outputs (e.g., for provision to peripheral components). In an example embodiment, the processing circuitry 101 may include one or more instances of a processor 103, associated circuitry, and memory 102. As such, the processing circuitry 101 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 102 may include one or more non-transitory memory devices such as, for example, volatile or non-volatile memory that may be either fixed or removable. The memory 102 may be configured to store information, data, applications, instructions or the like for enabling, for example, querying and navigating media items in a VR environment in accordance with example embodiments. The memory 102 may operate to buffer instructions and data during operation of the processing circuitry 101 to support higher-level functionalities, and may also be configured to store instructions for execution by the processing circuitry 101. The memory 102 may also store applications for execution by the processing circuitry 101 in order to carry out the functionality associated with each respective application or archives of media items as described herein. In this regard, for example, rather than the archive 170 being accessible to the user device 100 via the network 106, the archive 170 may, according to some example embodiments, be stored directly on the memory 102 locally.

As mentioned above, the processing circuitry 101 may be embodied in a number of different ways. For example, the processing circuitry 101 may be embodied as various processing means such as one or more processors 103 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 101 may be configured to execute instructions stored in the memory 102 or otherwise accessible to the processing circuitry 101. As such, whether configured by hardware or by a combination of hardware and software, the processing circuitry 101 may represent an entity (e.g., physically embodied in circuitry—in the form of processing circuitry 101) capable of performing operations according to example embodiments while configured accordingly. Thus, for example, when the processing circuitry 101 is embodied as an ASIC, FPGA, or the like, the processing circuitry 101 may be specifically configured hardware for conducting the operations described herein. Alternatively, as another example, when the processing circuitry 101 is embodied as an executor of software instructions, the instructions may specifically configure the processing circuitry 101 to perform the operations described herein.

The communication interface 105 may include one or more interface mechanisms for enabling communication with other devices external to user device 100, via, for example, the network 106, which may, for example, be a local area network. In some cases, the communication interface 105 may be any means such as a device or circuitry embodied in either hardware, or a combination of hardware and software that is configured to receive or transmit data from/to devices in communication with the processing circuitry 101. The communications interface 105 may be a wired or wireless interface and may support various communications protocols.

According to some example embodiments, the communications interface 105 may be configured to communicate with external entities such as the network 106. The network 106 may be any form of organized interconnection of communicating devices such as a personal area network, a local area network, or a wide area network. The network 106 may also embody combinations of sub-networks that include connections between the sub-networks. According to some example embodiments the network 106 may include or incorporate the Internet.

The user interface 104 may be controlled by the processing circuitry 101 to interact with peripheral devices that can receive inputs from a user or provide outputs to a user. In this regard, via the user interface 104, the processing circuitry 101 may be configured to provide control and output signals to a peripheral device such as, for example, the VR interface 150 and the haptic interface device 160, and receive input signals from a peripheral device. The user interface 104 may also produce outputs, for example, to render a VR environment on the display 151 of the VR interface 150. According to some example embodiments, the user interface 104 may also operably couple to other user input or output devices such as, for example, a keyboard, mouse, touch screen, speaker, microphone, or the like.

As mentioned above, the processing circuitry 101 may be operably coupled to and control various user interface devices such as a VR interface 150 and a haptic interface device 160. The VR interface 150 may include a display 151 and a motion sensor 152. The VR interface 150 may be embodied in various forms, including, for example, a VR headset. In this regard, the display 151 may be disposed near the users eyes to facilitate creation of an immersive visual presentation of a VR environment. In addition to the display 151, the VR interface 150 may include other sensory outputs to the user, such as audio outputs via speakers or the like.

The VR interface 150 may also include a motion sensor 152. The motion sensor 152 may be an accelerometer or similar device for detecting or sensing motions performed by the user. In this regard, in example embodiments where the VR interface 150 is a headset, the motion sensor 152 may be configured to detect movements of the user's head and thus provide an input the processing circuitry 101 that can be used to modify a viewing direction into the VR environment based on the user's head movement.

The haptic interface device 160 may be any type of the device that includes one or more sensors that can detect a gesture (e.g., a hand motion gesture) performed by a user. A gesture may be a sequence of movements that when considered together indicate an action to be performed in the VR environment. In this regard, the haptic interface device 160 may include a glove (e.g., one on each hand) with motion sensors that are configured to detect finger, hand, and arm motions that can be interpreted as gestures. The motion sensors within the glove may be associated with joints in the user's fingers and arms to determine a position of each joint. The gloves may also include location sensors that are configured to determine a position of the glove within a space relative to an origin or within a coordinate system. Further, as mentioned above, the haptic interface device 160 may also include a palette device that can be held and referred to while in the VR environment. The palette device may, according to some example embodiments, be configured to communicate interactions with the palate device to the processing circuitry 101 as a haptic interface device 160. The haptic interface device 160 may also include motion sensors, such as accelerometers, that are configured to detect relative motion to thereby permit the processing circuitry 101 to determine positions of the haptic interface device 160 (e.g., positions of the hands, possibly, in relation to the palette device). The haptic interface device 160 may provide input signals to the processing circuitry 101 and the input signals can be analyzed to determine if a discernable gesture has been performed by the user. In this regard, the signals may be compared to a digital library of possible gestures (e.g., stored within the memory 102) to determine a match. For example, the user may perform a pointing gesture (e.g., extended index finger and arm in a direction in front of and to the upper left of the user's head) that may be interpreted as a selection operation of an item that is disposed in a space in the VR environment above and the to the left of the user's viewpoint within the VR environment. As such, due to the various motion sensors of the haptic interface device 160, the haptic interface device 160 may facilitate movement of, for example, a pointer or the like in a VR environment being presented to the user via the display 151.

According to some example embodiments, the user device 100 may also have access to an archive 170. The archive 170 may comprise a collection of media items and associated metadata for each media item stored in a variety of manners, such as, in a database. As such, the archive 170 may include a plurality of media items that may be linked or classified based on shared attributes. The archive 170 may be searchable via a query and media items, or portions of media items (e.g., thumbnails, clips, or the like), may be returned to the processing circuitry 101 as results from the query for subsequent interaction as further described herein. As shown in FIG. 1, the archive 170 may be accessible to the user device 100 via the network 106 and may be stored, for example, on servers located remote from the user device 100. However, according to some example embodiments, the archive 170 may be stored locally, for example, in memory 102. Further, according to some example embodiments, the archive 170 may be stored in a distributed fashion where, for example, portions of the media items (e.g., thumbnails, clips, etc.) are stored or copied into a first storage environment (e.g., memory 102 or front-line query servers) and complete instances of the media items are stored in a second storage environment (e.g., deep storage servers).

Figure 2:
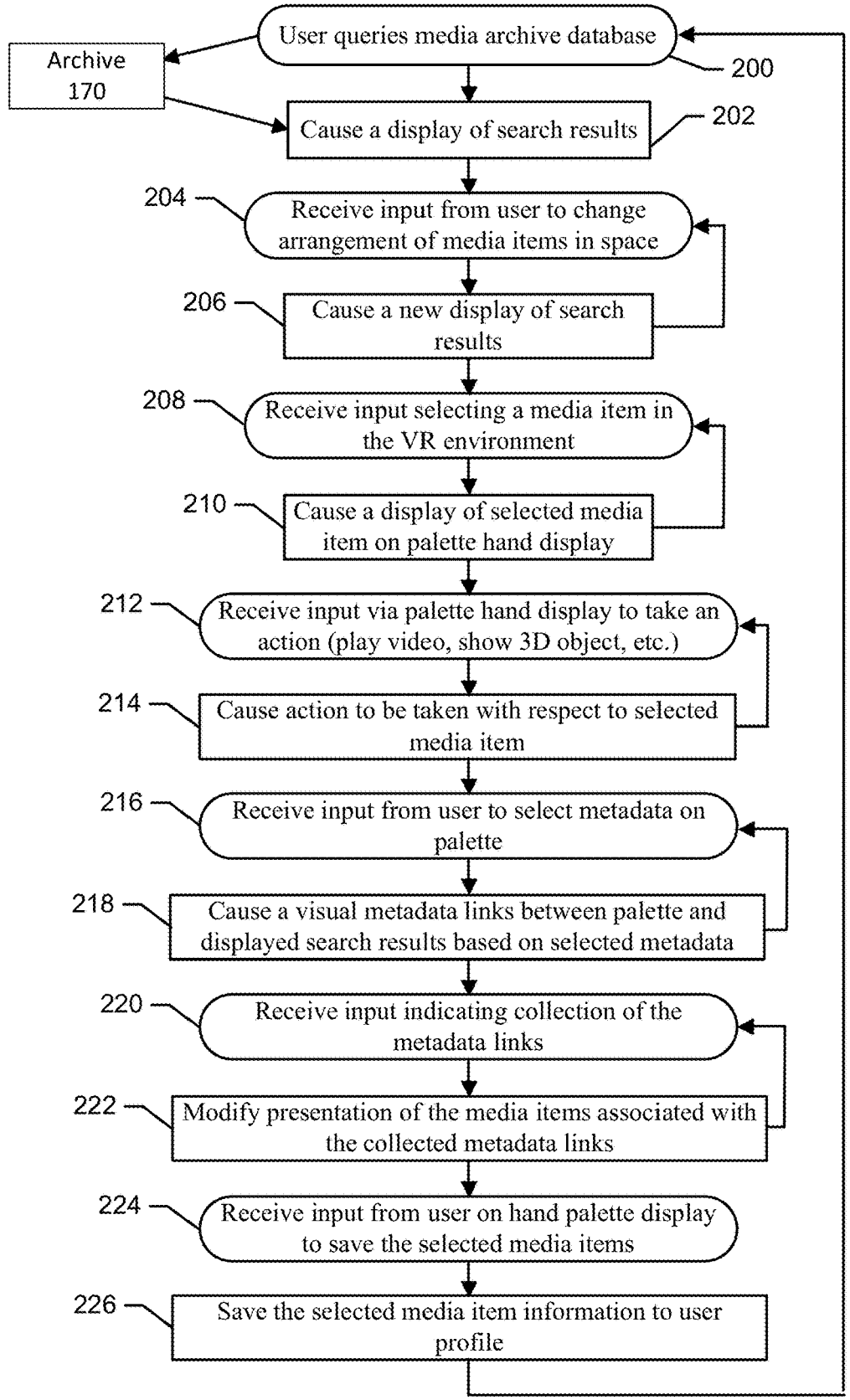

The example system 10 and the processing circuitry 101 may be configured to perform various functionalities described herein. In this regard, the flowchart of FIG. 2 illustrates an example method with various operations that the system 10 may be configured to perform as described herein according to some example embodiments. The example method of FIG. 2 will now be explained with support from the example rendered visualizations of a related VR environment in FIGS. 3-11.

The example method may begin with the user querying a media archive database at 200, which may involve formulation of a query by a user and delivery of the query to an archive database (e.g., archive 170). The query may include one or more query parameters that may be used to determine satisfying results from the archive 170. The query parameters may associate directly with metadata fields for the media items in the archive 170 (e.g., using a "contains" requirement), or the query parameters may designate broader categories of media item attributes (e.g., titles beginning with designated characters and wildcards, a range of years for creation of media items, geographic regions of origin for media items, language used in media items, etc.) Regardless of the types and scope of the query parameters, the results of the query may be returned and the processing circuitry 101 may be configured to cause a display of the search results at 202, via, for example, the display 151 of the VR interface 150 which may render the results for the user.

In this regard, upon execution of the query, a plurality of results may be rendered that satisfy the query. According to some example embodiments, satisfaction of the query may be associated with a similarity rating and, as set by a user, only results to that meet or exceed a threshold similarity rating with the query may be returned and rendered as results. The results may be rendered, for example, in manner that permits the user to move or navigate through the results using haptic inputs in the form of, for example, gestures. In this regard, for example, the user may move their head (as detected by the motion sensors of a headset, such as, VR interface 150) or move their hands (e.g., in a swimming motion to move through and around the media item results as detected by sensors of an enabled glove, such as, haptic interface device 160) to move or navigate through the media items to identify one of media items of interested in the result set.

Further, the results may be rendered as representations of the full media item. In this regard, representations in the form of thumbnails (e.g., lower quality versions of the full image or lower resolution version of the full image) may be provided for still images and video clips (e.g., shorter and lower quality versions of a video) or thumbnails may also be provided for video clips. According to some example embodiments, a maximum threshold for the memory size of the representation may be set and, for example, for video clips that exceed the maximum threshold size when rendered at a reduced resolution, the representation of the video clip may be a still image thumbnail or a shortened version of the video clip. The representations of the media items may also be interactive, such that, a user may select or bring into view a representation of a desired media item to cause retrieval of additional information about the media item, such as metadata. For example, if the media item is a still image, the user may select the representation of the media item to render a preview of a full-quality version of the still image for further inspection by the user. Additionally, for a video media item, the user may select the representation of the media item to cause a preview of the full video to be played for inspection by the user. Further, according to some example embodiments, a representation of a media item may be selected and, in response, metadata associated with the media item may be displayed for further inspection by a user. As such, the representations of the media items returned from a query may be dynamic and interactive to allow the user to discover additional information or otherwise further investigate a media item result in a VR environment.

Additionally, according to some example embodiments, a query result may be returned as a media item collection. In this regard, the representation of the media item that is rendered as a result in the VR environment may be representative of a plurality of underlying media items that have been grouped. According to some example embodiments, the example system 10 and the processing circuitry 101 may be configured to permit a user to move or navigate into the constellation within the VR environment to further investigate individual media items within the group while removing from rendering media items that are not within the group. Accordingly, the group as a whole or individual items within the group may be selectable by the user, via the user device 100, in the VR environment.

Accordingly, based on the foregoing, the user device 100 and the processing circuitry 101 may be configured to receive inputs from the VR interface 150 and the haptic interface device 160 to change the arrangement of the representations of the media items, at 204, that were returned from the query in the VR environment. The change in the arrangement of the representations of media items may occur in response to, for example, navigation performed by the user through gestures applied within the VR environment as described above. As a result, the processing circuitry 101 may be configured to cause a new display of the search results to be provided. The new display of the representations of the media items may be displayed in a new arrangement due to navigation through the results in the VR environment. In this regard, updated, new displays of the representations of media items may be provided as further navigation takes place. As such, the example method may repeatedly return to 204 to receive further inputs and cause a new display of the results at 206 until a user has navigated in a manner such that the arrangement of representations of the media items is desirable.

Figure 3:
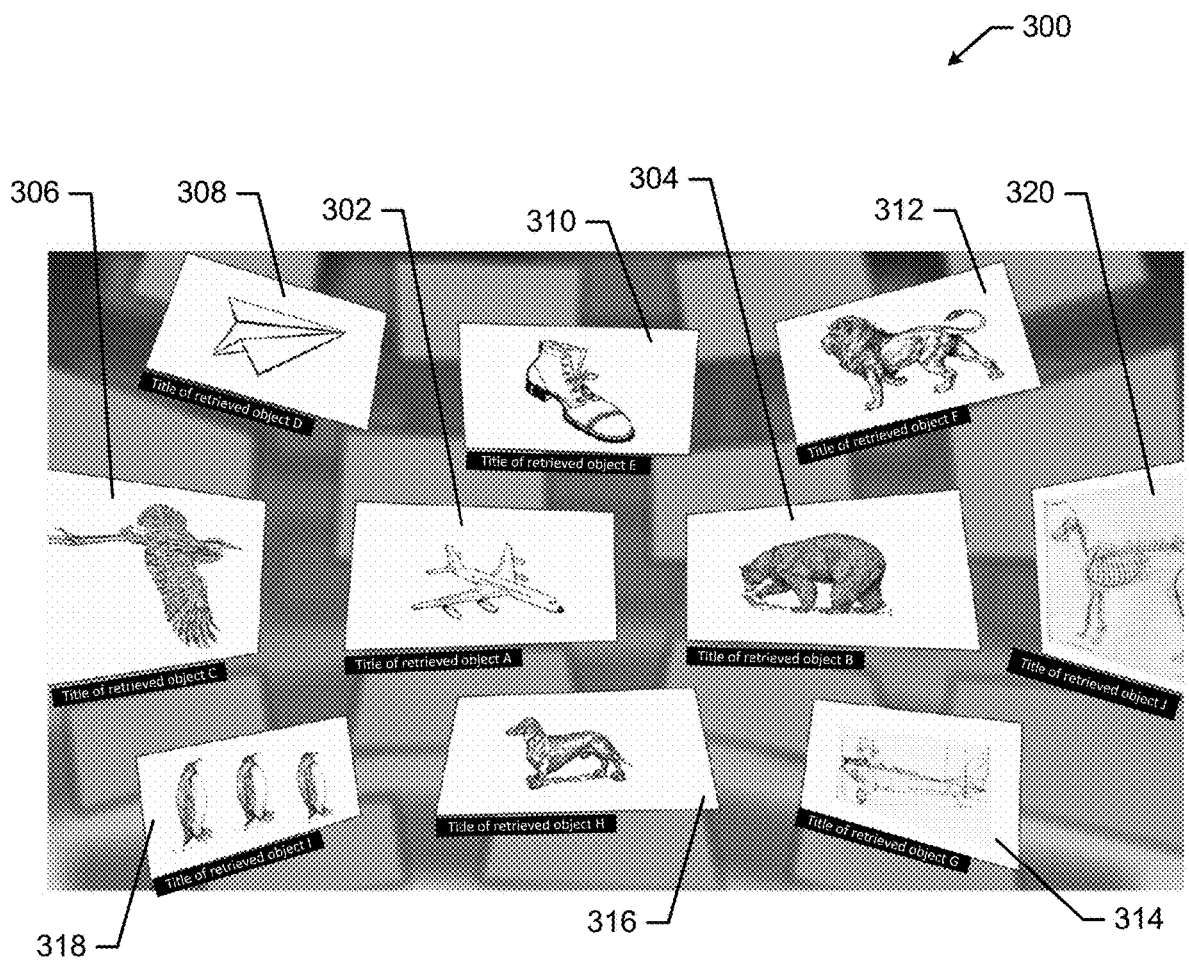
FIG. 3 illustrates an example rendering of representations of media items according to an example embodiment.

In this regard, FIG. 3 illustrates an example rendering 300 of a VR environment with an arrangement of representations of media items that have been returned from a query and moved via navigation to a desired viewpoint to be presented to the user within the VR environment. In this regard, the representations include representation 302 of an airline jet (object A), representation 304 of a bear (object B), representation 306 of a bird (object C), representation 308 of a paper airplane (object D), representation 310 of a shoe (object E), representation 312 of a lion (object F), representation 314 of a propeller airplane (object G), representation 316 of a dog (object H), representation 318 of penguin (object I), and representation 320 of an animal skeleton (object J). These representations may be rendered in an array in the VR environment, such that the representations appear to the be disposed on an internal surface of a sphere with the viewpoint at the center of the sphere. Further, the representations of media items may also be rendered as constellations or groups where certain metadata attributes may cause certain media items to be grouped in a constellation within the VR environment.

At 208, the example method may include receiving an input from the user selecting a media item in the VR environment. In this regard, having set the viewpoint in the VR environment, the user may select one of the media items by performing a gesture to select the desired media item, which may be detected and acted upon by, for example, the processing circuitry 101. The motions associated with the selection gesture may be detected by the haptic interface device 160 and associated signals may be provided to the processing circuitry 101 for analysis to determine which representation has been selected.

Figure 4:
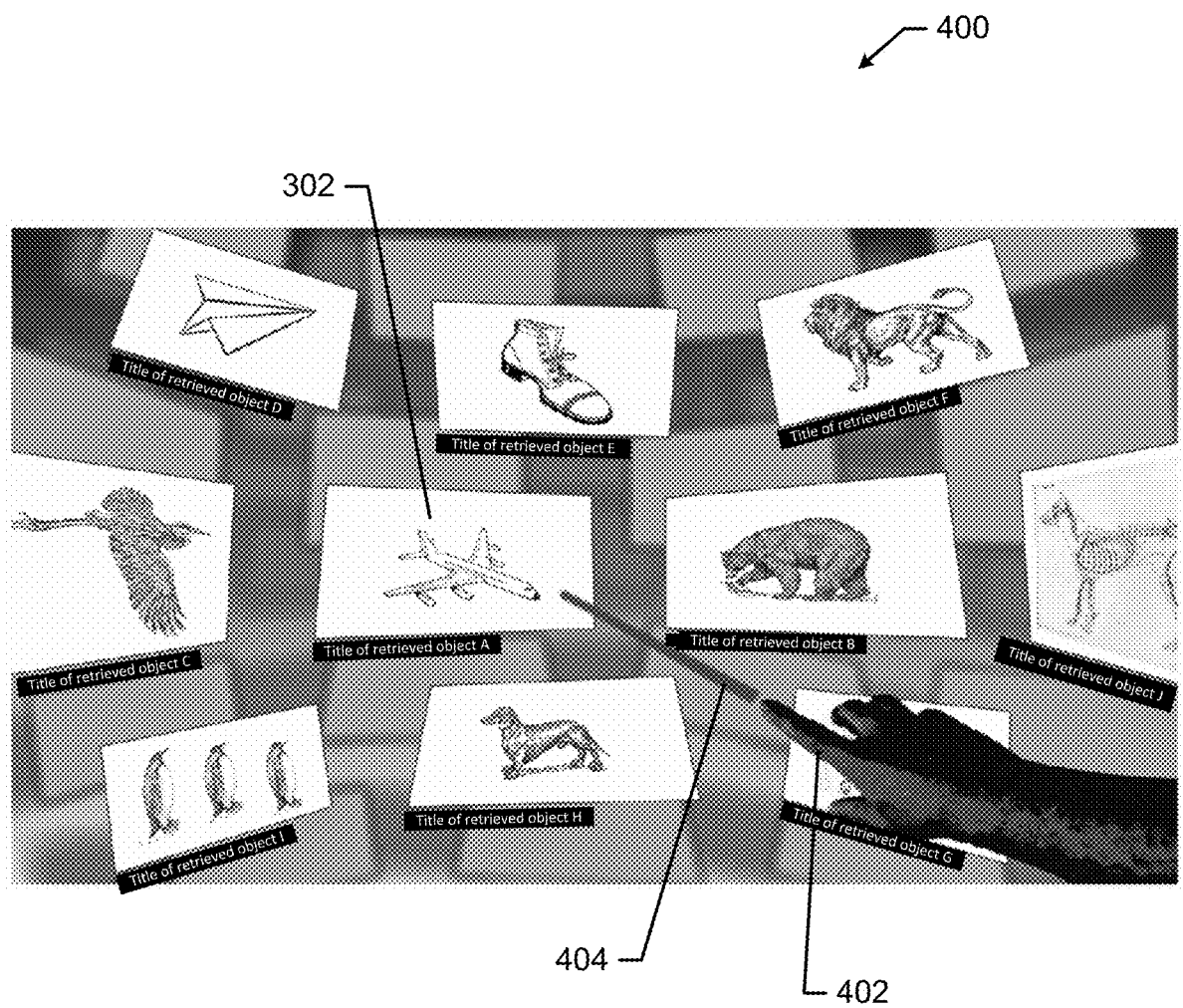
FIG. 4 illustrates an example rendering of representations of media items with a finger pointer selector according to an example embodiment.
Figure 5:
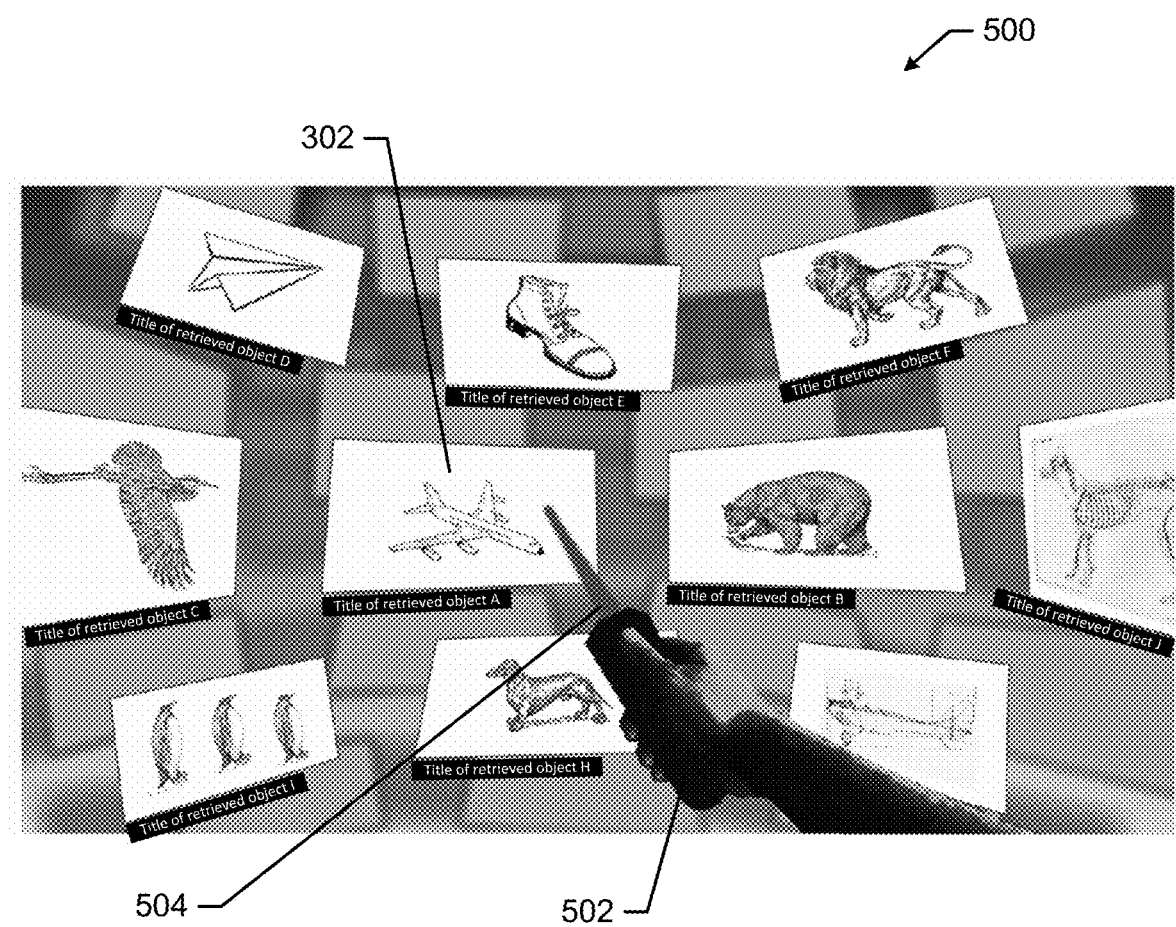
FIG. 5 illustrates an example rendering of representations of media items with a device pointer selector according to an example embodiment.
Figure 6:
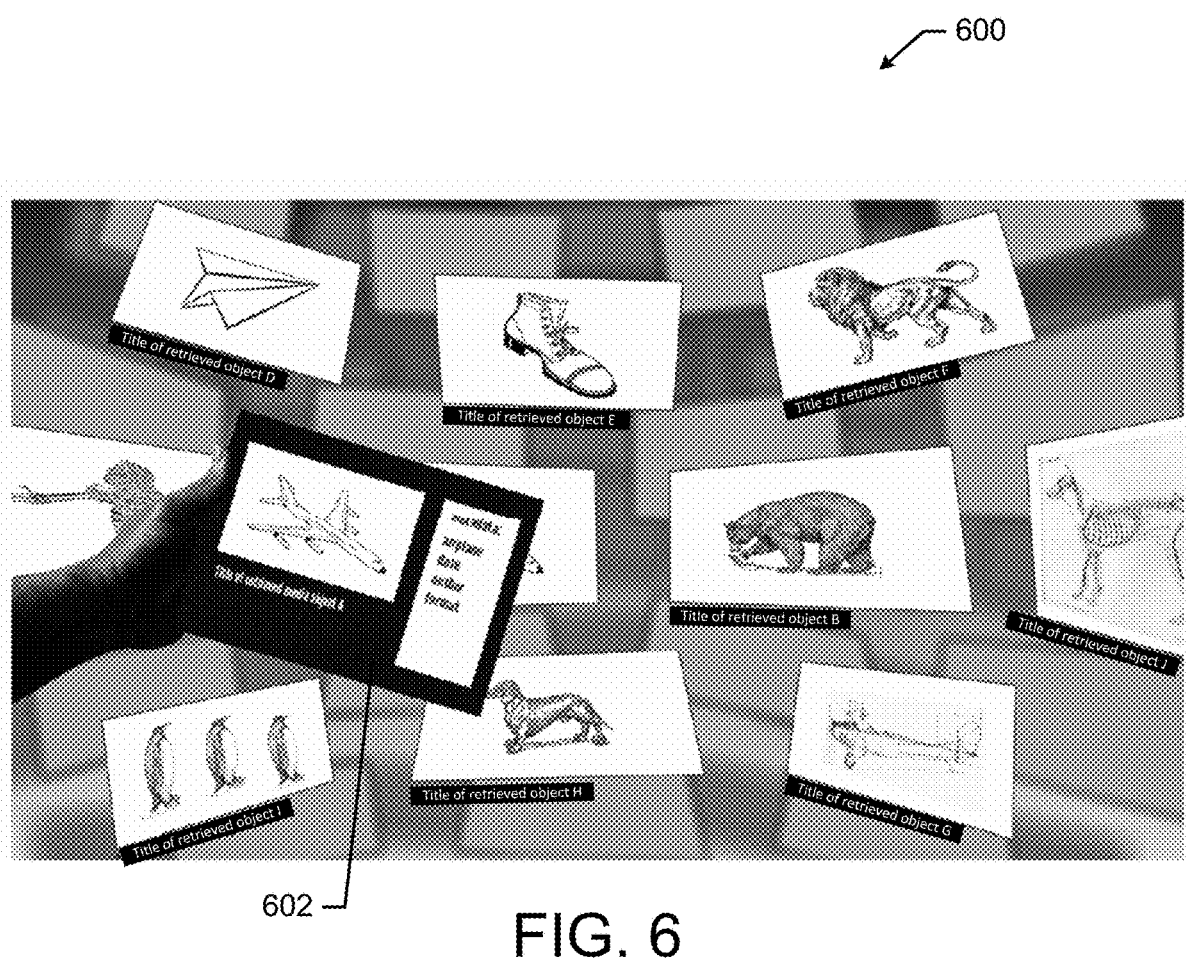
FIG. 6 illustrates an example rendering of a palette device hand display in a VR environment according to an example embodiment.
Figure 7:
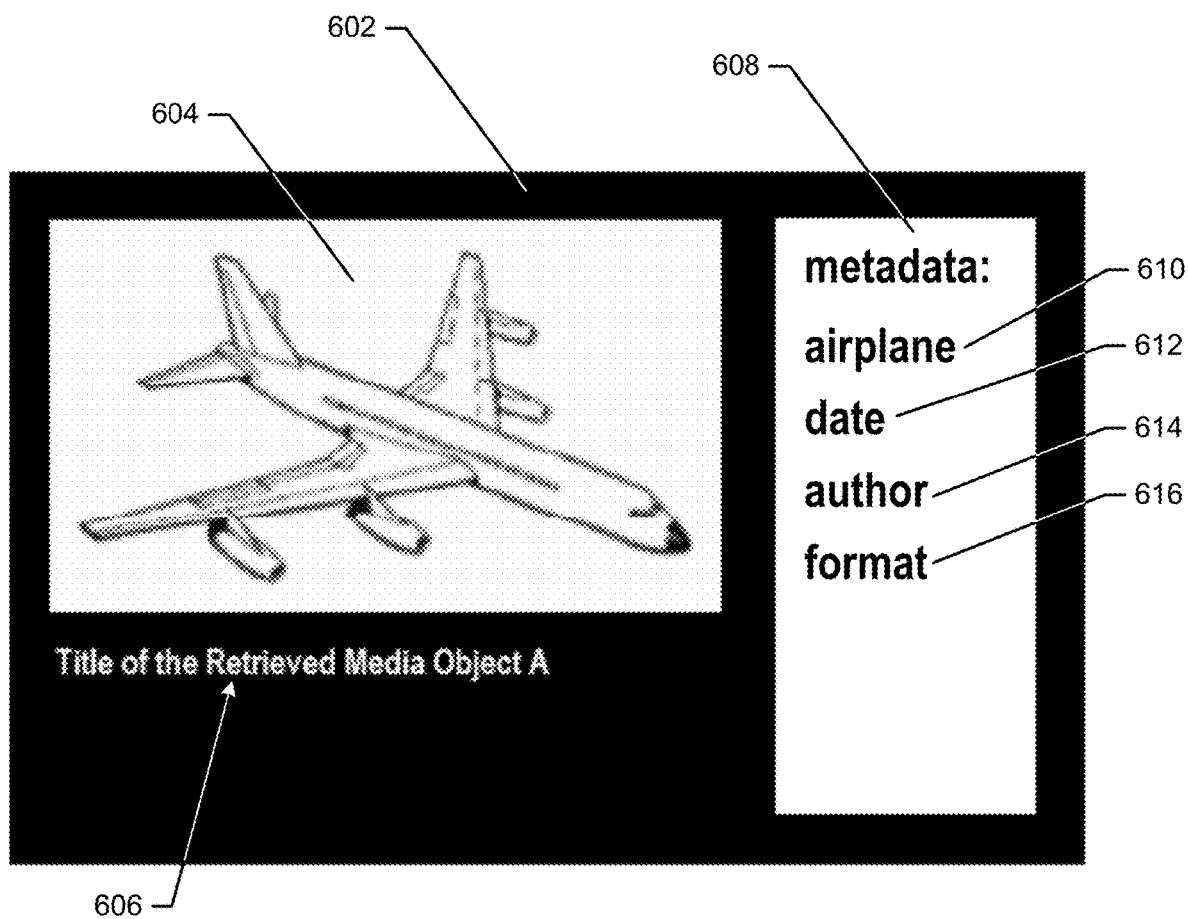
FIG. 7 illustrates example palette device hand display according to an example embodiment.
Figure 8:
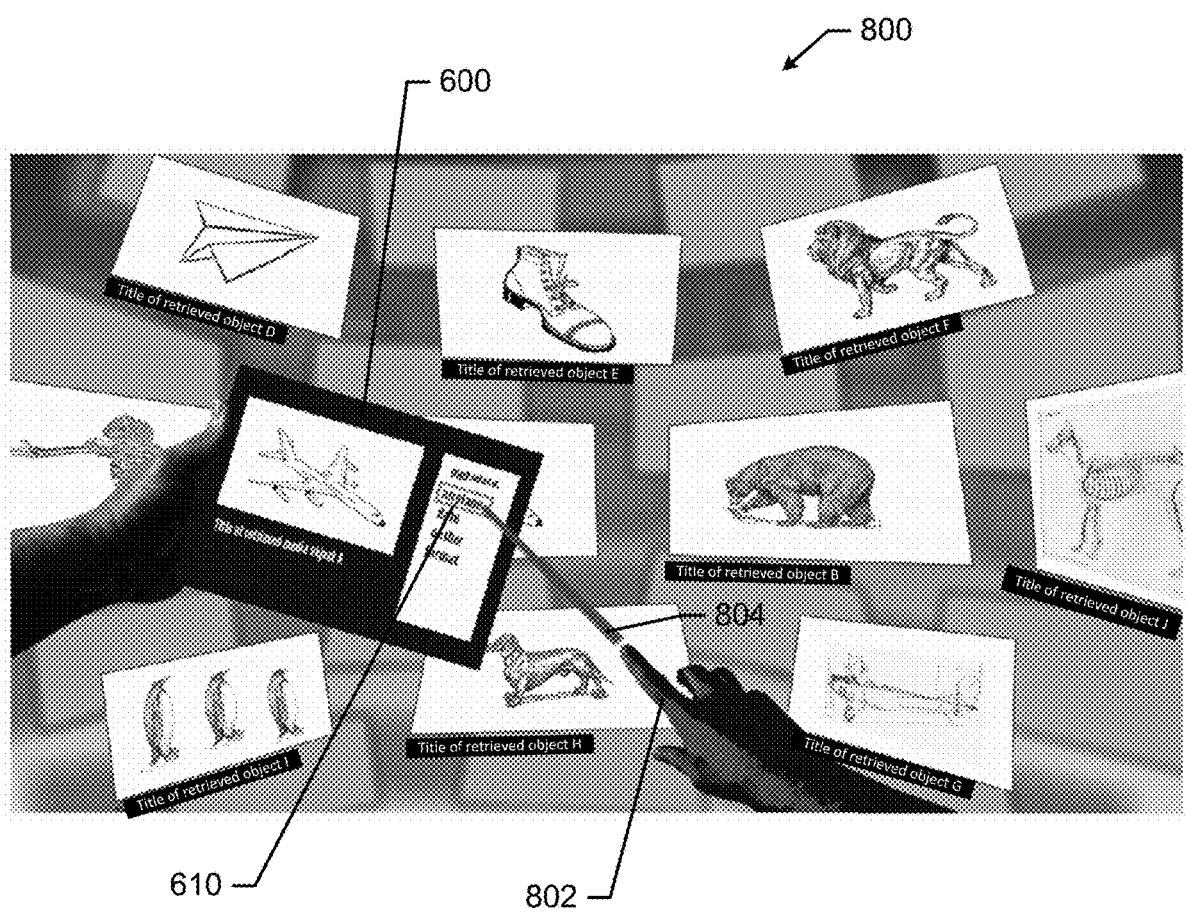
FIG. 8 illustrates an example rendering of a palette device hand display with a finger pointer selector according to an example embodiment.
Figure 9:
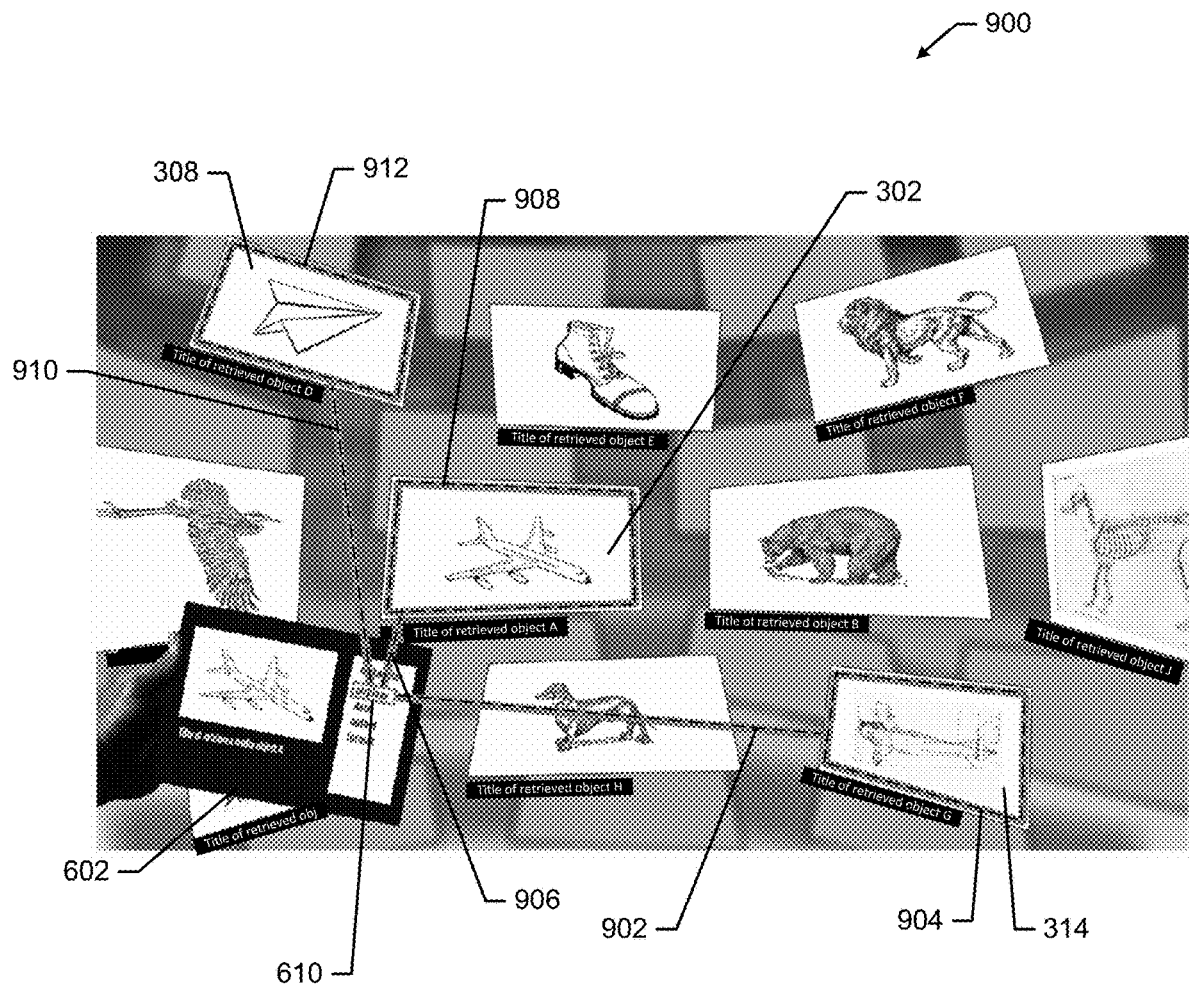
FIG. 9 illustrates an example rendering of representations of media items with metadata links according to an example embodiment.
Figure 10:
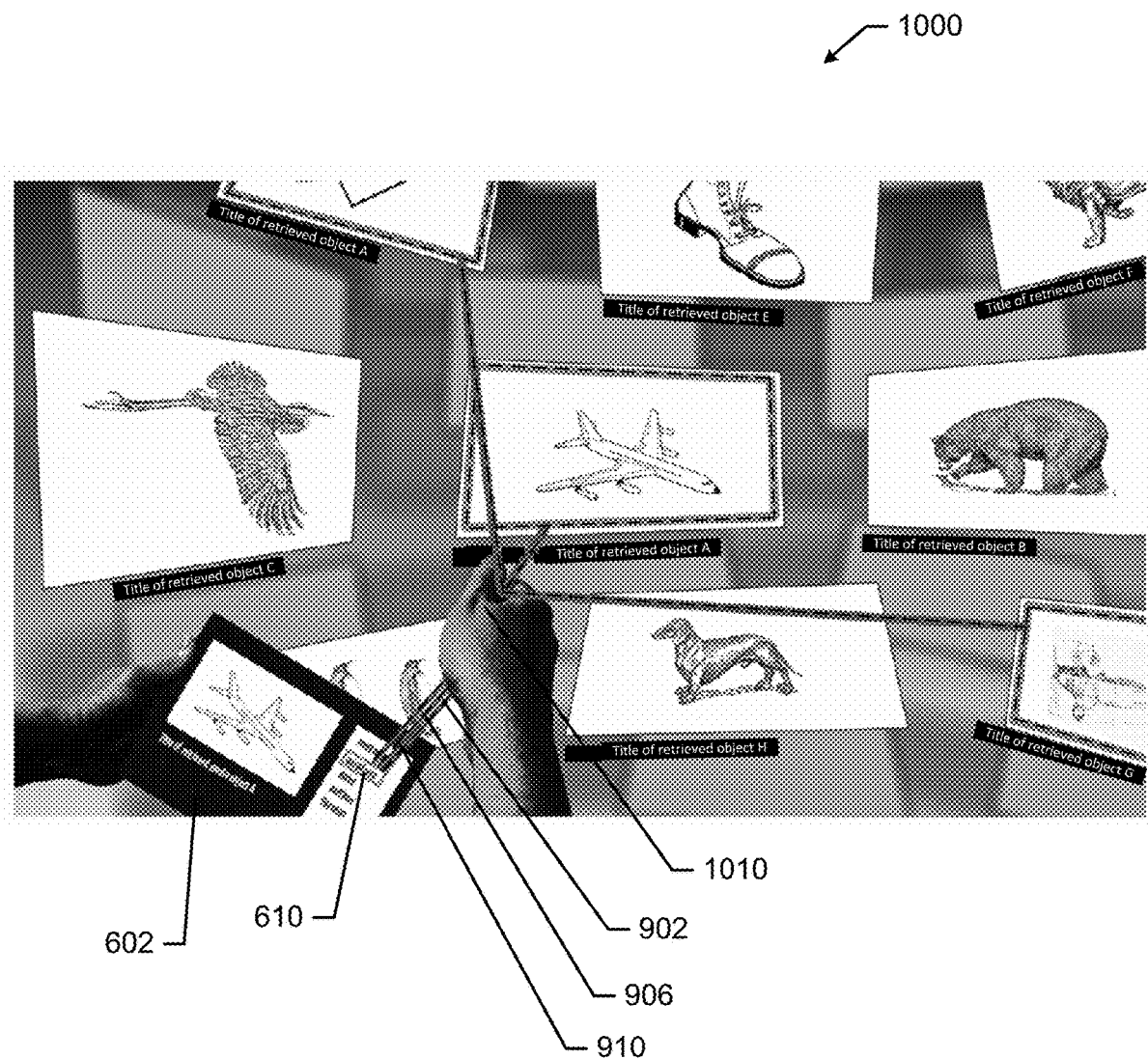
FIG. 10 illustrates an example rendering of representations of media items with metadata links collected into a bundle according to an example embodiment.

As shown in FIG. 4, the rendering 400 of the VR environment may be altered to show a virtual hand and arm to assist the user in pointing to the desired media item for selection. Further, by detecting the extension of the pointer finger of the hand via, for example, sensors in a glove, the processing circuitry 101 may cause the display 151 to render a virtual pointer finger 402 as well as, for example, and a pointer beam 404. Such an example embodiment may be implemented with a haptic interface device 160 that includes a glove. Alternatively, as shown in the rendering 500 of FIG. 5, a pointer-type device 502 may be rendered with a pointer beam 504, again, to assist the user with selection of a media item in the VR environment. Such an example embodiment may be implemented with a haptic interface device 160 that includes a handheld controller. In either case, the user has selected the representation 302 of the airline jet in this example scenario.

In response to receiving the input selection of the desired media item at 208, a display of the selected media item may be provided on, for example, a palette device hand display 602 at 210. In this regard, as shown in the rendering 600 provided in FIG. 6, the palette device hand display 602 may be rendered in the foreground of the VR environment. The palette device hand display 602 may be a component of the haptic feedback device 160 or may be virtually embodied. The palette device hand display 602 may be moveable via user movement of the haptic interface device 160 and may also be interacted with via the haptic interface device 160. As more clearly shown in FIG. 7, the palette device hand display 602 may include a representation of the selected media item 604 with the title 606 of the selected media item being provided with (e.g., below) the representation 604. Further, the palette device hand display 602 may also include a metadata section 608 that may be populated with metadata attributes or categories associated with the selected media item. In the scenario being described, the representation 302 (associated with an image of an airline jet) has been selected and therefore an associated image is provided at 604. Additionally, in the metadata section 608, the metadata attributes or categories for the scenario are airplane 610, date 612, author 614, and format 616. It is noteworthy that, while the rendering 600 shows a palette device hand display 602, any other type of interface may be displayed in place of the palette device hand display 602 that at least includes some identifying information for the selected media item (e.g., representation, title, etc.) and a listing of the metadata associated with the selected media item. Further, any attributes or categories of metadata may be shown in the metadata section 608 and, therefore, the options for metadata attributes or categories are not limited to those provided here. Further, as shown in FIG. 2, a user may repeatedly select representations of media items to cause receipt of selection inputs at 208, and, as a result, cause associated palette device hand displays to be rendered at 210.

At 212, the example method may further include receiving an input via the palette device hand display 602 to take an action with respect to the selected media item. In this regard, a user may select, for example, the representation 604 on the palette device hand display 602 to cause an action to be performed with respect to the selected media item. As a result, at 214, the processing circuitry 101 may be configured to cause an action to be taken with respect to the selected media item. For example, if the selected media item is a video clip, then the video clip may be played within the VR environment (e.g., on the palette device hand display 602) for the user. In another example, if the selected media item is a three-dimensional model of an object, then the object may be rendered in the VR environment (e.g., on the palette device hand display 602) in a manner that permits a user to manipulate the three-dimensional object to view the object from any viewpoint. In another example, if the selected media item is a still image, then the image may be rendered in the VR environment (e.g., on the palette device hand display 602) at maximum quality to permit the user to view details of the image and, for example, zoom into and pan to selected portions of the image. In another example, if the selected media item is an audio recording, then the audio recording may be played for the user to hear the recording. As such various actions may be taken based on the type of media item that has been selected. Further, such action at 214 may be repeated each time an associated input is received as indicated at 212.

At 216, according to the example method, input from a user may be received to select metadata on the palette device hand display 602. In this regard, the user device 100 and the processing circuitry 101 may be configured to receive inputs from, for example, the haptic interface device 160 indicating which of the metadata attributes or categories is being selected. As shown in the rendering 800 of the VR environment in FIG. 8, a virtual hand and arm may be rendered to assist the user in pointing the desired metadata item. Further, by detecting the extension of the pointer finger of the hand, the processing circuitry 101 may cause the display 151 to render a virtual pointer finger 802 and a pointer beam 804. Such an example embodiment may be implemented with a haptic interface device 160 that includes a glove. Alternatively, a pointer-type device (e.g., device 502) may be rendered with a pointer beam, again, to assist the user with selection of a metadata item in the metadata section 608 of the palette device hand display 602. Such an example embodiment may be implemented with a haptic interface device 160 that includes a handheld controller. In either case, in the example scenario, the user has selected the metadata attribute for airplane 610. Upon selection, the rendering of the selected metadata attribute or category may be boxed or highlighted to indicate that the selection has been made.

In response to receiving the metadata attribute or category selection, the example method may further include causing visual metadata links to be rendered between the palette device hand display 602 and the displayed search results based on the selected metadata at 218. In this regard, based on the selection of the metadata attribute or category, the processing circuitry 101 may be configured to cause the display 151 to render metadata links between the representations of media items that share the selected metadata and the selected metadata attribute or category on the palette device hand display 602. Further, each representation of a media item having the selected metadata may be boxed or highlighted to indicate the metadata relationship. Additionally, a user may repeatedly select different metadata attributes or categories at 216 to cause different visual connections to the representations of media items to be rendered at 218.

With respect to the scenario being described, the user selected the metadata for airplane 610 on the palette device hand display 602. As shown in the rendering 900 in FIG. 9, having selected the metadata for airplane 610, metadata links may be rendered between the metadata for airplane 610 and the representations of media items that have airplane metadata, i.e., representation 302 of the airline jet, representation 308 of the paper airplane, and representation 314 of the propeller airplane. In this regard, the representation 302 of the airline jet may be marked by box 908 and linked to the metadata for airplane 610 by metadata link 906, the representation 308 of the paper airplane may be marked by box 912 and linked to the metadata for airplane 610 by metadata link 910, and the representation 314 of the propeller airplane may be marked by box 904 and linked to the metadata for airplane 610 by metadata link 902.

At 220, the example method may further comprise receiving inputs (e.g., from the haptic interface device 160) indicating that a collection of the metadata links, performed by a user, has occurred. In this regard, a user, as detected by the haptic interface device 160, may perform a grasping gesture to grasp the metadata links in the VR environment into a bundle to indicate control over and selection of the media items associated with the metadata links in the bundle. According to some example embodiments, a user may be selective in the metadata links that are collected and therefore some links may be collected while others may remain out of the collection of links that are grasped. As shown in the rendering 1000 of FIG. 10, the user's hand 1010 may be rendered as the user collects each of the metadata links 902, 906, and 910 and grasps the collection of links as a bundle.

At 222, the example method may further include modifying the presentation of the media items associated with the collected metadata links. In this regard, in response to collecting the metadata links into a bundle, the representations of media items associated with the collected links may be presented, by the display 151, in a foreground of the VR environment as being selected from the results set. More generally, the representations of media items associated with the collected links may be selected or otherwise separated from the other query results for further actions in isolation. Further, according to some example embodiments, the representations of media items associated with the collected links may be presented in the foreground of the VR environment as being selected from the results set after also a pulling gesture is performed and detected after the grasp of the metadata links is detected, for example, by the haptic interface device 160. Alternative to the pulling gesture, a button press or other interaction may be the triggering event that is detected by the haptic interface device 160 to cause the representations of media items associated with the collected links be selected or otherwise separated from the other query results for further actions in isolation. Similar to the operations above, a user may release the collection of metadata links and re-collect the metadata links at 220 repeated times thereby leading to repeated modified presentations of media items at 222.

Figure 11:
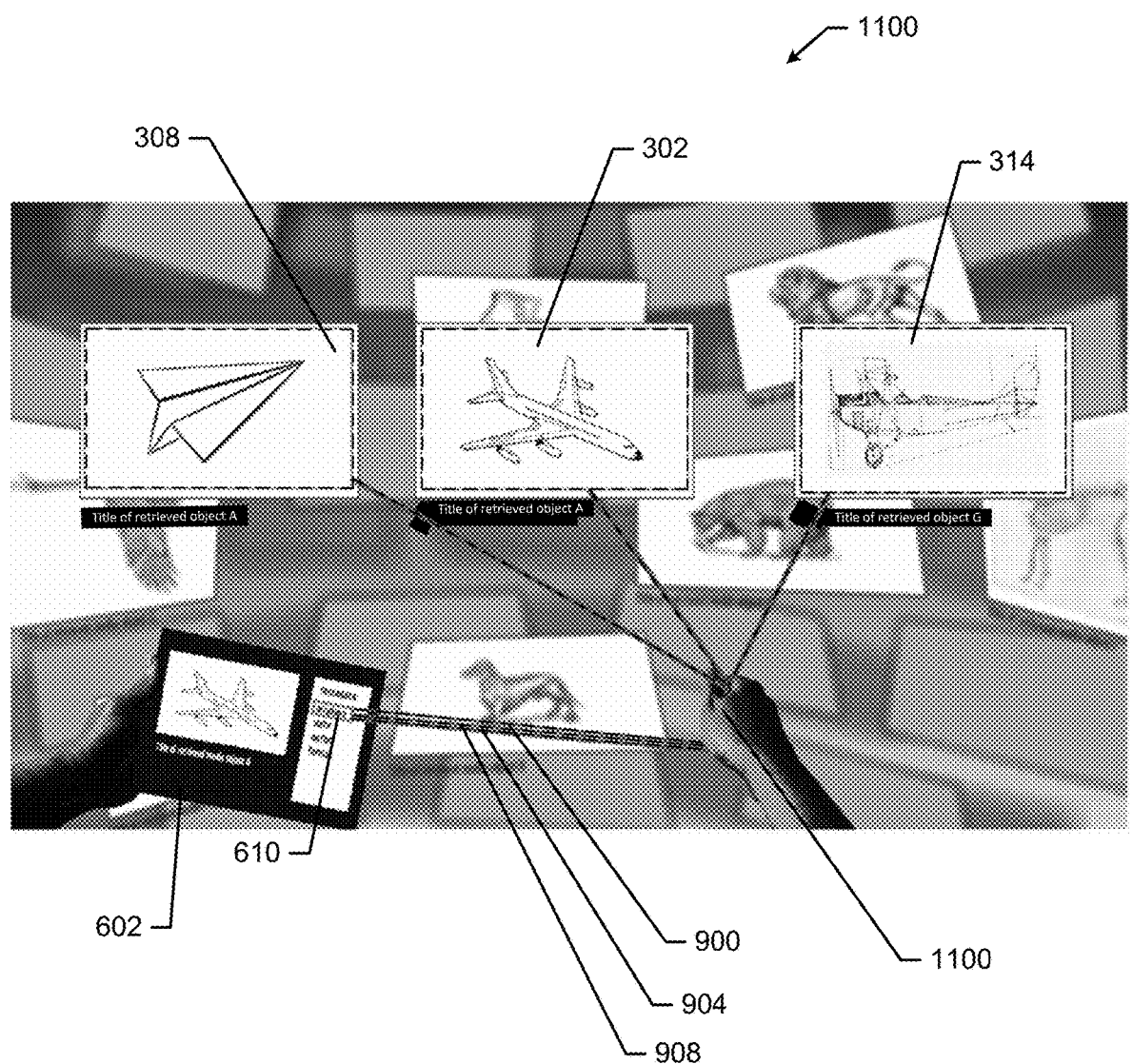
FIG. 11 illustrates an example rendering of representations of media items with metadata links collected into a bundle and pulled according to an example embodiment.

In this regard, with reference to the rendering 1100 in FIG. 11, the user has performed a pulling gesture on the bundle of metadata links 900, 904, and 908 as shown by the moved hand 1100 and the stretched appearance of the metadata links. Upon detection of this pulling gesture of the collection, the representations 302, 308, and 314 may be caused to be brought to the foreground of the VR environment. Accordingly, the media items underlying these representations may be deemed to be selected from the query result set. As an alternative to detected the pulling gesture, according to some example embodiments, a virtual or physical button press may be detected, and in response to such a button press, the representations 302, 308, and 314 may be caused to be brought to the foreground of the VR environment.

Additionally, the example method may include receiving input from the user on the palette device hand display 602 to save the selected media items at 224. In this regard, the user may interface with the palette device hand display 602 to request that the selected media items or information associated with and identifying the selected media items be saved. In this regard, at 226, information associated with the selected media items may be saved to a user profile. The user profile may define an instance of a person or login on a computer system. The information associated with media items may be saved in the form of a playlist for later reviewing or playing by the user associated with the user profile.

Having described some example embodiments with reference to FIGS. 1 and 2-11, FIG. 12 provides another flowchart of an example method that may be performed by the user device 100 or the processing circuitry 101, possibly within the context of the system 10. In this regard, an example method for interacting with media items is also provided. The example method may include receiving a query at 1200 and controlling a display of a virtual reality interface to render representations of media items returned from the query in a virtual reality environment at 1210. Further, at 1220, the example method may include detecting motion of the user from a motion sensor of the virtual reality interface and modifying a viewpoint into a virtual reality environment such that a representation of a desired media item is within view. The example method may further comprise, at 1230, detecting, from a haptic interface, a first haptic gesture to select the representation of the desired media item. Additionally, according to some example embodiments, the example method may include detecting, from the haptic interface, another (e.g., third) haptic gesture to select a metadata attribute associated with the desired media item. At 1240, controlling the display to render metadata links between the selected metadata attribute and the representations of the media items that have the selected metadata attribute. Additionally, the example method may include, at 1250, detecting, from the haptic interface, a second haptic gesture to bundle and pull the metadata links to a foreground. At 1260, the example method may comprise controlling the display to render representations of the media items having the selected metadata attribute in the foreground for selection. Further, at 1270, the example method may include receiving, at the processing circuitry, a selection of the media items that have the selected metadata links in response to detecting the second haptic gesture to bundle and pull the selected metadata links the foreground.

Additionally, according to some example embodiments, the example method may include controlling the display to render the metadata links as connecting lines between the selected metadata attribute and the representations of the media items that have the selected metadata attribute. Additionally or alternatively, the example method may further include detecting the second haptic gesture to bundle the metadata links as comprising a detection of a hand moving from an open position to a closed position. Additionally or alternatively, the virtual reality interface comprises a head-mounted display and the haptic interface device comprises a glove. Additionally or alternatively, the example method may further include controlling the display to render the desired media item on a palette device hand display within the virtual reality environment. Additionally or alternatively, the example method may include controlling the display to render a plurality of metadata attributes associated with the desired media item on the palette device hand display within the virtual reality environment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system for interacting with media items in a virtual reality environment, the system comprising:
    processing circuitry;
    a virtual reality interface operably coupled to the processing circuitry and comprising a display and a motion sensor, wherein the display is configured to render a virtual reality environment and wherein the motion sensor is configured to detect motion of a user; and
    a haptic interface device operably coupled to the processing circuitry;
    wherein the processing circuitry is configured to:
        control the display to render representations of media items, the media items being associated with a metadata attribute;
        control the display to render metadata links between the metadata attribute and the representations of the media items that have the selected metadata attribute;
        detect, from the haptic interface, a haptic gesture to bundle and pull the metadata links into a foreground; and
        receive, at the processing circuitry, a selection of the media items that have the metadata links that have been bundled and pulled into the foreground, in response to detecting the haptic gesture to bundle and pull the metadata links into the foreground.

2. The system of claim 1, wherein the processing circuitry is configured to control the display to render the metadata links as connecting lines between the metadata attribute and the representations of the media items.

3. The system of claim 1, wherein the processing circuitry is configured to detect the haptic gesture to bundle the metadata links as comprising a detection of a hand moving from an open position to a closed position.

4. The system of claim 1, wherein the virtual reality interface comprises a head-mounted display and the haptic interface device comprises a glove.

5. The system of claim 1, wherein the processing circuitry is further configured to detect, from the haptic interface, a second haptic gesture to select the representation of a desired media item.

6. The system of claim 5, wherein the processing circuitry is further configured to control the display to render the desired media item on a palette device hand display within the virtual reality environment.

7. The system of claim 6, wherein the processing circuitry is further configured to control the display to render a plurality of metadata attributes associated with the desired media item on the palette device hand display within the virtual reality environment.

8. An apparatus for interacting with media items in a virtual reality environment, the apparatus comprising processing circuitry configured to:
    control a display of a virtual reality interface to render representations of media items in the virtual reality environment, the media items being associated with a metadata attribute;
    control the display to render metadata links between the metadata attribute and the representations of the media items that have the metadata attribute;
    detect, from the haptic interface, a haptic gesture to bundle and pull the metadata links into a foreground; and
    receive, at the processing circuitry, a selection of the media items that have the selected metadata links that have been bundled and pulled into the foreground, in response to detecting the haptic gesture to bundle and pull the metadata links into the foreground.

9. The apparatus of claim 8, wherein the processing circuitry is configured to control the display to render the metadata links as connecting lines between the metadata attribute and the representations of the media items.

10. The apparatus of claim 8, wherein the processing circuitry is configured to detect the haptic gesture to bundle the metadata links as comprising a detection of a hand moving from an open position to a closed position.

11. The apparatus of claim 8, wherein the virtual reality interface comprises a head-mounted display and the haptic interface device comprises a glove.

12. The apparatus of claim 8, wherein the processing circuitry is further configured to detect, from the haptic interface, a second haptic gesture to select the representation of a desired media item.

13. The system of claim 12, wherein the processing circuitry is further configured to control the display to render the desired media item on a palette device hand display within the virtual reality environment.

14. The system of claim 13, wherein the processing circuitry is further configured to control the display to render a plurality of metadata attributes associated with the desired media item on the palette device hand display within the virtual reality environment.

15. A method comprising:
   controlling a display of a virtual reality interface to render representations of media items in the virtual reality environment, the media items being associated with a metadata attribute;
   controlling the display to render metadata links between the metadata attribute and the representations of the media items that have the metadata attribute;
   detecting, from the haptic interface, a haptic gesture to bundle and pull the metadata links into a foreground; and
   receiving, at the processing circuitry, a selection of the media items that have the metadata links that have been bundled and pulled into the foreground, in response to detecting the haptic gesture to bundle and pull the metadata links into the foreground.

16. The method of claim 15, further comprising controlling the display to render the metadata links as connecting lines between the metadata attribute and the representations of the media items.

17. The method of claim 15, further comprising detecting the haptic gesture to bundle the metadata links as comprising a detection of a hand moving from an open position to a closed position.

18. The method of claim 15, wherein the virtual reality interface comprises a head-mounted display and the haptic interface device comprises a glove.

19. The method of claim 15, further comprising detecting, from the haptic interface, a second haptic gesture to select the representation of a desired media item.

20. The method of claim 19, further comprising controlling the display to render the desired media item on a palette device hand display within the virtual reality environment.

* * * * *

UNITED STATES PATENT AND TRADEMARK OFFICE
CERTIFICATE OF CORRECTION

| | |
|---|---|
| PATENT NO. | : 11,269,419 B2 |
| APPLICATION NO. | : 16/932274 |
| DATED | : March 8, 2022 |
| INVENTOR(S) | : Simon Tarr and Evan Meaney |

It is certified that error appears in the above-identified patent and that said Letters Patent is hereby corrected as shown below:

In the Drawings

Figure 12:
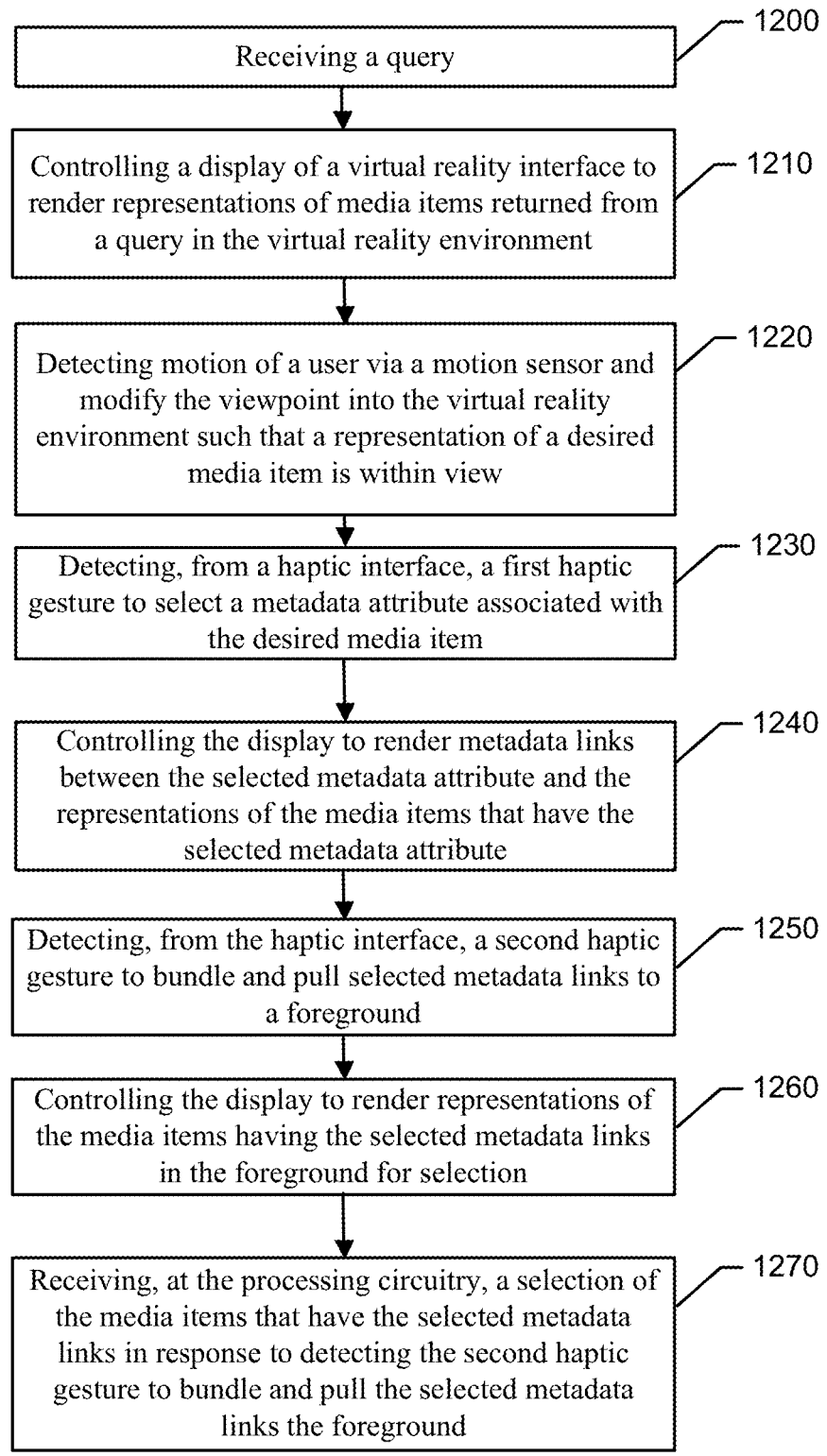
FIG. 12 illustrates an example method for interacting with media items according to an example embodiment.

Sheet 12, Fig. 12, in reference numeral 1270, "pull the selected metadata links the foreground" should read --pull the selected metadata links into the foreground--

In the Claims

In Column 15, Claim 13, Line 5 "The system of claim 12" should read --The apparatus of claim 12--

In Column 15, Claim 14, Line 9 "The system of claim 13" should read --The apparatus of claim 13--

Signed and Sealed this
Fifteenth Day of November, 2022

Katherine Kelly Vidal
*Director of the United States Patent and Trademark Office*